Patented Aug. 27, 1935

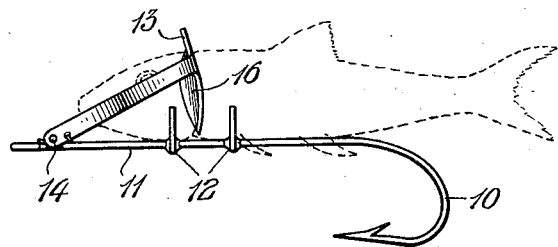
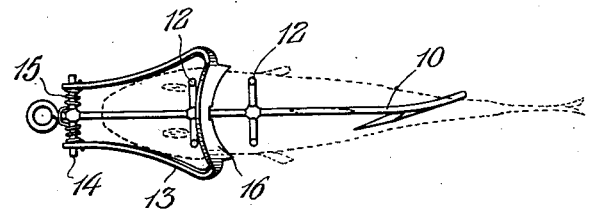
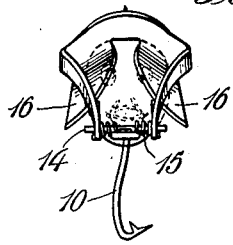
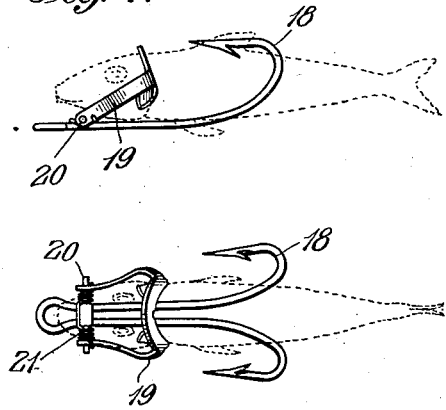
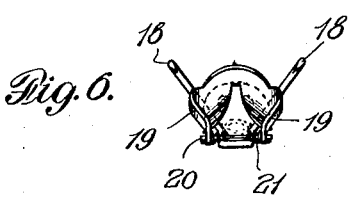

2,012,786

UNITED STATES PATENT OFFICE 2,012,786

BAIT HOLDER OR HARNESS

Clyde C. Hoage, Tower, Minn.

Application November 9, 1934, Serial No. 752,351

8 Claims. (Cl. 43—40)

This invention relates to fishing tackle and more particularly to a bait holder or harness for live minnows It is an object of my invention to provide an improved bait holder adapted to securely hold live minnows of different sizes without injury and in such a manner as to permit relatively free movement of the minnow while it is securely held in desired relationship with a fish hook.

A further object of my invention is to provide a device of the character described which is simple and easy to apply and which does not require hooking or mutilation of the minnow.

Further objects and advantages of my invention will appear on consideration of the following description of the embodiments shown in the accompanying drawing wherein Fig. 1 is a side view of a bait holder or harness embodying the invention;

Fig. 2, a top view of the device shown in Fig. 1;

Fig. 3, an end view of the same, and

Figs. 4, 5 and 6 are similar views of a modification.

Referring to the drawing, the bait holder or harness is shown in association with a fish hook 10 having a shank portion 11 adapted to be attached to a fishing line in the usual manner. One or more wires or cross bars 12 are secured to the shank portion of the fish hook in such a manner as to provide a cradle to receive the minnow. Obviously this cradle may be constructed in many ways, as for example integral with the fish hook 10.

In order to securely hold the minnow upon the shank portion of the fish hook 10, the clamping member 13 is provided, said clamping member being pivoted at the point 14 to the fish hook. The free end of the clamping member 13 is biased toward the shank portion of the fish hook by a spring 15. The free end of the clamping member is provided with two spaced wings or ears 16 shaped to conform to the body portion of the minnow and to fit in the gills as shown in Figs. 1 and 2. The minnow is shown in dotted lines in the drawing in order to illustrate how the clamping member 13 is operative to hold the minnow without injury and without restraining the movements thereof by reason of the engagement of the wing portions 16 behind the gills.

The strength of the spring 15 is merely sufficient to hold the minnow upon the cradle formed by the bars 12 and since the minnow is wedged between the wing portions 16 of the clamping member and thus held against lengthwise or sidewise movement with respect to the fish hook, the spring 15 may be comparatively light and functions properly even when weakened by continued exposure in use.

The mounting and arrangement of the clamping member 13 may be modified in various ways without departing from the scope of the invention, and as shown in Figs. 4 to 6, the clamping member may be employed with various forms of fishing tackle. As shown in these figures, a double fish hook 18 is employed of such shape as to eliminate the necessity for the cross bars 12. The clamping member 19, substantially similar to clamping member 13 in the embodiment shown in Figures 1, 2 and 3 is pivoted at the point 20 to the fish hook 18. The clamping member 19 is urged towards the fish hook 18 by a spring 21. In this modification the points of the fish hook 18 are bent upwardly so as to embrace the body of the minnow and thereby cooperate to hold the same while not preventing the necessary freedom of movement so that the minnow simulates a free minnow.

Various other modifications of the construction shown and described above for purposes of illustration may be made without departing from the scope of my invention as defined in the appended claims.

I claim:—

1. A bait holder or harness for minnows comprising a fish hook having a point and a shank portion and an adaptable clamping member transversely pivoted on the fish hook and overlying the shank portion thereof, said clamping member being provided with spaced wing portions adapted to fit into the gills of the minnow.

2. A bait holder or harness for minnows comprising a fish hook, and an adaptable clamping member pivoted transversely thereon, said clamping member being provided with spaced wing portions adapted to fit into the gills of a minnow.

3. In a bait holder or harness for minnows or the like, spaced sheet metal clamping members transversely curved to conform to the shape of the minnow and adapted to fit into its gills.

4. A bait holder or harness for minnows comprising a fish hook, cross members on said hook forming a cradle, a clamping member transversely pivoted to said hook with the free end thereof overlying said cross members, and a spring biasing the clamping member towards said cross members.

5. A bait holder or harness for minnows comprising a double pointed fish hook constructed to form a cradle for a minnow and a transversely pivoted clamping member on the shank portion of said hook, said clamping member being provided with curved wing portions adapted to fit in the gills of the minnow.

6. In a bait holder or harness for minnows or the like, a clamping member having transverse bearings and extensions adapted to engage the gills of the minnow, the clamping member being adapted to be pivotally mounted on a transverse axis on the shank of a hook.

7. A bait holder or harness for minnows comprising a frame adapted to form a cradle for the body of the minnow and having a fish hook projecting outwardly therefrom and a clamping member pivoted transversely on said frame and provided with spaced clamping elements forming curved wing-portions adapted to fit into the gills of the minnow.

8. A bait holder or harness for minnows comprising a frame adapted to form a cradle for the body of the minnow, said cradle having two pairs of upwardly extending prongs and said frame having a fish hook projecting outwardly therefrom and a clamping member pivoted on said frame and provided with spaced clamping elements movable between the pairs of prongs and forming curved wing-portions adapted to fit into the gills of the minnow.

CLYDE C. HOAGE.